(No Model.) W. T. & J. D. CALTON. CULTIVATOR.
No. 468,907. 2 Sheets—Sheet 1.
Patented Feb. 16, 1892.
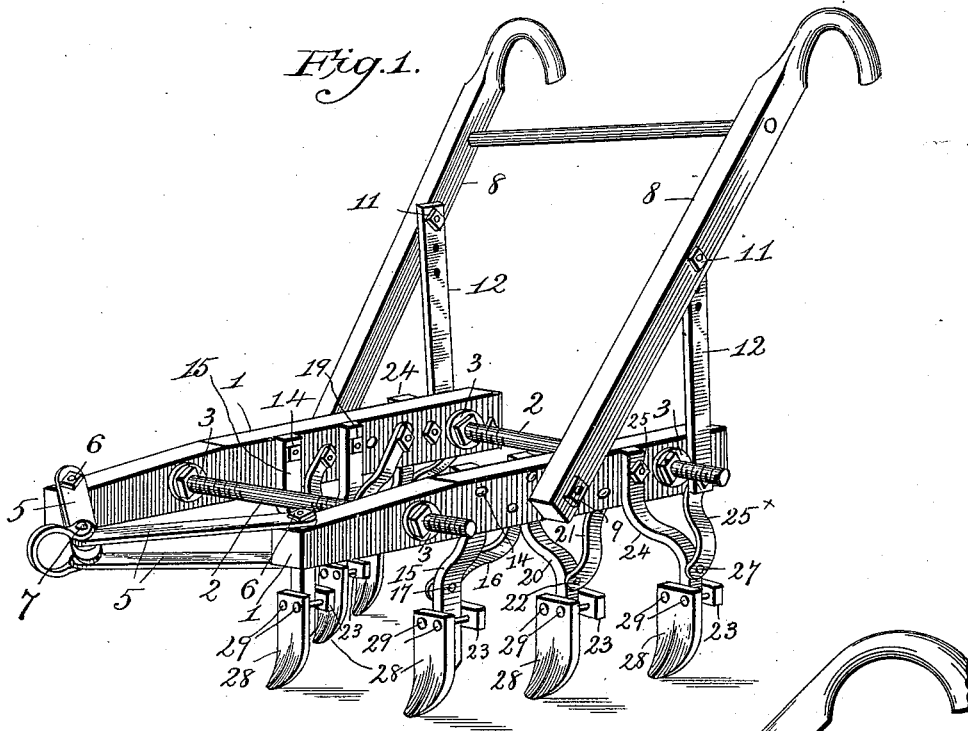
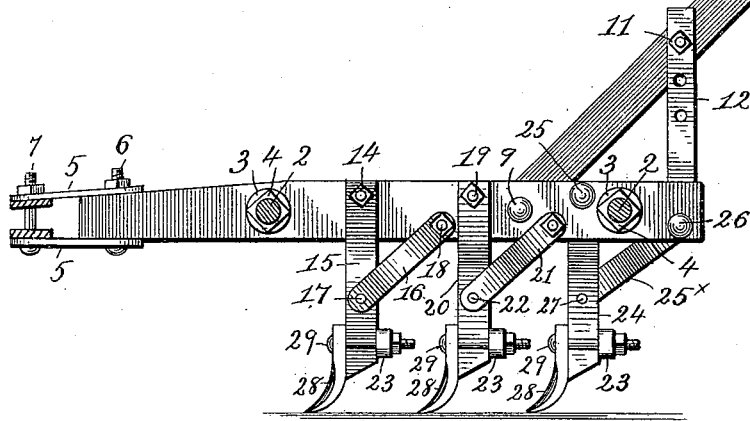
Witnesses:
Wm A. Schoenborn
W. S. Duvall
Inventors
William T. Calton
John D. Calton
By their Attorneys,
C. A. Snow & Co.

(No Model.) 2 Sheets—Sheet 2.

W. T. & J. D. CALTON.
CULTIVATOR.

No. 468,907. Patented Feb. 16, 1892.

Witnesses:
Wm. A. Schoenborn
W. S. Duvall

Inventors:
William T. Calton
John D. Calton
By their Attorneys,
C. A. Snow & Co.

UNITED STATES PATENT OFFICE.

WILLIAM T. CALTON AND JOHN D. CALTON, OF NEW HOUSE, NORTH CAROLINA.

CULTIVATOR.

SPECIFICATION forming part of Letters Patent No. 468,907, dated February 16, 1892.

Application filed June 17, 1891. Serial No. 396,576. (No model.)

*To all whom it may concern:*

Be it known that we, WILLIAM T. CALTON and JOHN D. CALTON, citizens of the United States, residing at New House, in the county of Cleveland and State of North Carolina, have invented a new and useful Cotton-Cultivator, of which the following is a specification.

This invention relates to improvements in cultivators of that class adapted for the cultivation of the cotton-plant; and the objects in view are to provide a simple construction of cultivator adapted to cultivate either single or straddle row and to provide means for readily converting the cultivator from one of the above forms of cultivator to the other.

A further object of the invention is to provide means for adjusting the cultivator to different widths of rows.

Other objects and advantages of the invention will appear in the following description, and the novel features thereof will be particularly pointed out in the claim.

Figure 3:
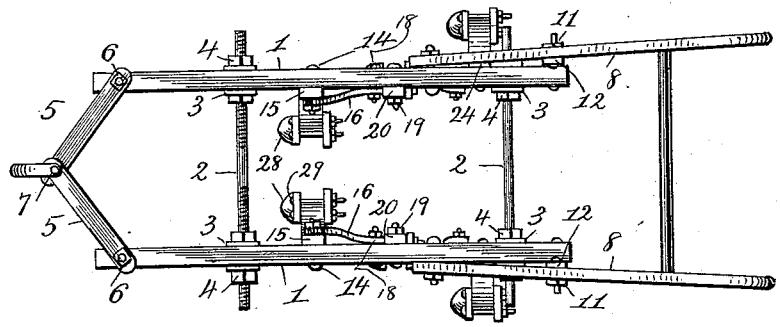
Figure 4:
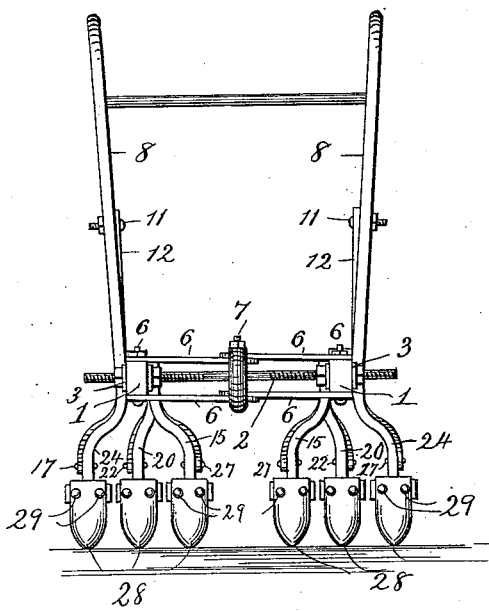
Figure 5:
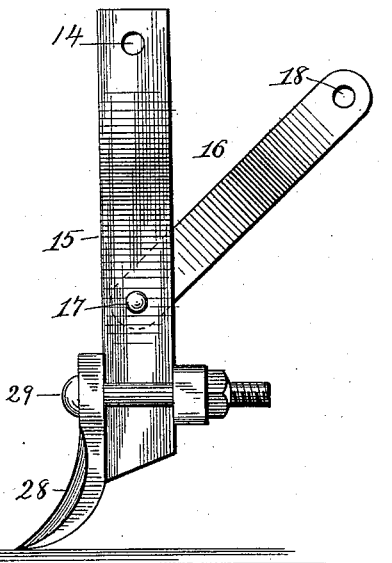

Referring to the drawings, Figure 1 is a perspective of a cultivator constructed in accordance with the invention. Fig. 2 is a vertical longitudinal section. Fig. 3 is a plan. Fig. 4 is a front elevation. Fig. 5 is a detail of one of the cultivator-standards and its shovel.

Like numerals of reference indicate like parts in all the figures of the drawings.

In practicing the invention opposite side bars 1 are employed, which bars are near their front and rear ends connected by adjustable tie-rods 2, threaded at each side of their centers and passed through perforations in the side bars. Upon the tie-bars and at each side of the side bars washer-plates or disks 3 are located, while outside of the same and bearing thereon adjusting caps or nuts 4 are located. The shovels hereinafter described being located upon each of the side bars, it will be obvious that by a proper manipulation of the nuts the side bars may be adjusted, and hence the distance between the two series of cultivators increased or diminished as the width of row to be cultivated may require.

Pairs of straps 5 are by vertical bolts 6 pivotally connected to the upper and lower sides of the beams 1 at the front ends of the latter, the inner ends of the straps being connected pivotally by means of a central draft-bolt 7, to which a clevis may be coupled.

8 designates ordinary handles, which are pivoted at 9 to the side bars near the rear ends of the latter, and said handle bars are adjustable by means of bolts 11, passed therethrough and through adjusting-holes formed in the upper ends of a pair of handle-supporting standards 12, pivoted at their lower ends to the side bars 1.

To about the center and upon the inner sides of the beams 1 there are bolted, as at 14, a pair of downwardly and inwardly curved standards 15, which are braced by rearwardly-inclined braces 16, bolted, as at 17, to the standards and, as at 18, to the side bars. In rear of the standards 15 there are bolted to the inner faces of the opposite side bars by bolts 19 depending standards 20, which are very slightly deflected and adapted to lie directly under said side bars. These standards 20 are braced by means of inclined braces 21, pivoted to the standards, as at 22, and at their upper ends bolted to the side bars, as at 23. In rear of the standards 20 there are bolted to the outer faces of the side bars a pair of rear standards 24 by means of bolts 25, said standards being deflected toward their lower ends, so as to extend outwardly from the side bars, and are braced by inclined braces 25*, bolted, as at 26, to the side beams and pivoted, as at 27, to the standards.

By disposing the standards as herein described it will be seen that each set of standards constitutes a series, the two series being inclined inwardly or in opposite directions toward the front of the frame-work, whereby the cultivator is adapted for straddle-row cultivating. It will be obvious that by changing the relative positions of the front and rear standards—that is, placing the rear outwardly-disposed standards to the front and the forward inwardly-disposed standards at the rear—the inclinations of the two series of standards are changed, so that, instead of converging toward their fronts, they diverge. By this arrangement of the standards the cultivator is adapted for single-row planting.

To the lower front faces of each of the standards cultivator-shovels 28 are secured by means of pairs of bolts 29, which embrace the opposite sides of the standards, each pair being connected by a perforated tie-plate 23, in rear of which the bolts are nutted, as shown. It will be obvious that the shovels may be removed and other forms of shovels from those herein shown substituted.

From the foregoing description, taken in connection with the accompanying drawings, it will be seen that we provide a cultivator that will successfully cultivate cotton, either by straddling the rows or by passing between the same, and whose shovels may be altered as to their positions and thus adapt the cultivator to perform the different functions ascribed. Furthermore, that the cultivator may be readily adjusted to straddle or cultivate between rows of varying widths.

Having described the invention, what is claimed is—

The combination, with the opposite beams, the handles projecting rearwardly therefrom, the spacing or adjustable tie-rods 2, connecting the beams, the opposite pairs of links 5, pivoted to the front ends of the beam, and the clevis having its pivot-bolt passed through the front ends of the links, of the plow-standards formed of flat bars of metal or wood bent laterally at an intermediate point of their length, the inclined braces pivoted to the standards below the bent portion thereon and also bent laterally in the same direction as the standard, and the shovels bolted to the standards, the upper ends of the standards and braces being bolted to the beams, the standards of each of which are arranged out of alignment, as set forth.

In testimony that we claim the foregoing as our own we have hereto affixed our signatures in presence of two witnesses.

WILLIAM T. CALTON.
JOHN D. CALTON.

Witnesses:
JAMES F. WILLIAMS,
J. W. BUMGARNER.